United States Patent [19]

Annast et al.

[11] Patent Number: 4,861,172
[45] Date of Patent: Aug. 29, 1989

[54] LIQUID SEAL FOR MACHINE PARTS MOVING ROTATIONALLY AND AXIALLY IN RELATION TO ONE ANOTHER

[75] Inventors: Rudolf Annast; Max Schuster, both of Passau; Dieter Maurer; Jürgen Rauter, both of Friedrichshafen, all of Fed. Rep. of Germany

[73] Assignee: Zahradfabrik Friedrichshafen AG, Fed. Rep. of Germany

[21] Appl. No.: 264,275

[22] Filed: Jun. 21, 1988

[51] Int. Cl.$^4$ .................. F16C 3/035; F16C 21/00; F16C 31/00; F16C 33/72
[52] U.S. Cl. .................. 384/477; 277/30; 277/37; 277/39; 277/51; 277/95; 384/16; 384/25; 384/126; 464/133; 464/162
[58] Field of Search .................. 384/16, 25, 126, 130, 384/142, 143, 153, 477, 481–486, 557, 577; 464/133, 162, 178; 277/95, 97, 30, 37–39, 51

[56] References Cited

U.S. PATENT DOCUMENTS

| | | | |
|---|---|---|---|
| 2,403,520 | 7/1946 | Gerner | 384/130 |
| 3,761,099 | 9/1973 | Hansson | 277/37 |
| 4,213,513 | 7/1980 | Mazziotti | 384/130 X |
| 4,693,699 | 9/1987 | Gregerson | 464/133 |

FOREIGN PATENT DOCUMENTS

| | | |
|---|---|---|
| 2025118 | 5/1970 | Fed. Rep. of Germany . |
| 2839816 | 3/1980 | Fed. Rep. of Germany . |
| 85926 | 7/1920 | Switzerland . |

*Primary Examiner*—Thomas R. Hannon
*Attorney, Agent, or Firm*—Davis, Bujold & Streck

[57] ABSTRACT

This anti-lead seal prevents the accumulation of torsional and tangential stresses on one and the same sealing element by way of an intermediate sleeve (6) which forms an axial seal gap (7) with one of the coordinated corrugated or housing-like machine parts (1, 2) and a radial seal gap (8) with the other. Since the intermediate sleeve (6) is firmly retained via a torsional safety (11) and an axial fixation (13), the sealing elements (9) for the radial seal gap (7) are stressed only by relative axial movements and the sealing elements (12) for the axial seal gap (8) are stressed only by rotational movements. Here simple elastomeric parts can be used that are easy to supply and can be quickly mounted.

8 Claims, 2 Drawing Sheets

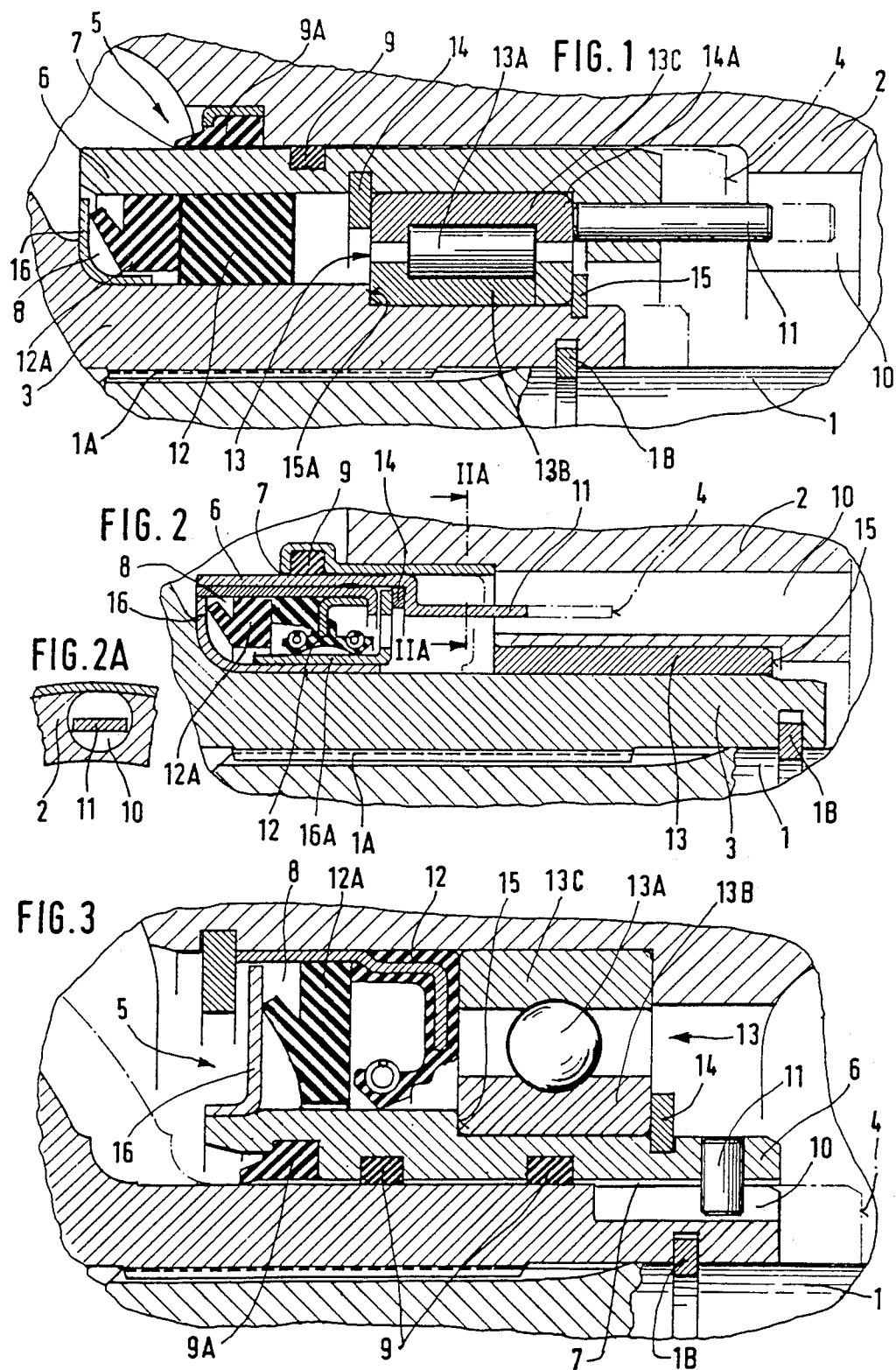

LIQUID SEAL FOR MACHINE PARTS MOVING ROTATIONALLY AND AXIALLY IN RELATION TO ONE ANOTHER

The invention concerns an anti-leak seal which is based on DE-A 28 39 816 where a propeller shaft bearing having seals against the penetration of water and the outflow of lubricant is shown. It is true that in this publication an intermediate sleeve firmly situated axially opposite the bearing housing serves for reinforcement and separation of the radial and axial seal gaps, and a bearing in the area of the seal is also provided. But no precautions are taken for holding the seals under sufficient pre-load even in the case of distinct axial and radial movements (eccentricities) without inadmissibly overstressing them. Thus, although radial and axial seals are associated with different seal gaps, they are neither secured against torsion nor axially movable relative to the intermediate sleeve. There are also no steps for limiting eventual movements of the seal.

CH-C 85 926 has also disclosed a packing box for rotary shafts having a radially mounted seal ring which, however, provides a seal only for the axial gap and does not take into account any axial and radial deflection movements. None of said known solutions show a manner of inserting sealing elements, between two simultaneously rotating machine parts movable relative to each other, whose torsional and tangential stresses are at the same time kept small.

The problem to be solved by the invention is to provide a simple seal well protected against the outside pentration of dirt and mechanical damage and against accumulated torsional and tangential changes of movement, and which, at the same time, is of short construction and its parts most exposed to abrasion can be easily manufactured and supplied at reasonable cost.

The solution is obtained by the fact that although the intermediate sleeve is axially movable with limitation, it is non-torsionally mounted so that only a linear relative movement can result on the part of the seal that closes the axial seal gap. In addition, since the intermediate sleeve is secured against torsion relative to the mating surface in the axial seal gap, only the seal part closing the radial seal gap can result in a rotational movement. Thereby it is prevented that accumulated dirt from the outside be continuously pumped in the interior of the seal when axial movements occur due to screw movements. Penetrating dirt, as an abrasive, would continuously produce in the area of the seal grooves wide seal gaps in which the sealing edges of the elastomeric rings would finally lose adhesiveness due to excessive deformation.

By virtue of the distinct relative movements that remain unchanged according to the invention, time-tried single-purpose sealing elements of elastomeric materials can be reliably tolerated without complicated spring elements or contact pressures. At the same time, the wear in the individual sealing edges due to the lowering of effective speeds is reduced by eliminating elongated metal-plate bending parts and rubber blanks of complicated constructions, simple and short standard sealing rings having lips, stripping edges, etc., optimally designed for the distinctly defined stress can be inserted in an adequately grooved or rigid streamlined intermediate sleeve as a supporting part. The replacement of such simple seal rings is not problematic and is very well suited to the conditions in developed countries or large-scale project sites. Since due to the slow wear and good pre-load constant it is possible to eliminate separate cushioning by springs or pressure elements, a simple short construction is favored. By means of the bearing situated directly in front of the seal proper, it is possible depending on the intended use, be designed with an axial gap situated on the inner face or the outer face of the intermediate sleeve. In addition, the seal part that closes the radial seal gap can be sufficiently spread axially or stressed by its own elasticity without using axial springs against the advance or rebound of the intermediate sleeve, on the one hand, and of the associated corrugated or housing-like machine part. The reduced contact pressures, in comparison to the sealing elements that work with springs, allow a longer life and also less frictional losses together with the steady stress directions.

The arrangement closed by the sealing element of a bearing, which simultaneously serves as axial fixation of the intermediate sleeve to one of the two machine parts, in addition, prevents that the sealing elements can become radially too irregularly loaded due to lateral forces such as are frequent precisely in steering forks, and can be deformed to the point of not sealing.

Axial fixation of a roller bearing helps to reduce further the friction in the sealing area and to keep the temperatures low.

If the torsinal safety is made from projections or vertical gearings that mesh in the axially moved machine part opposite the intermediate sleeve, the sealing elements that spans the radial seal gap can be safely protected from torsional stresses and the intermediate sleeve together with the sealing elements can be easily mounted.

A torsional safety produced only by the high radial stress of the sealing elements in the axial seal gap is recommendable and reduces cost and space compared to a torsional safety with profile gearing, especially when associated with a bearing of particularly low friction such as a roller bearing.

By means of an axial fixation, which can be achieved with an annular intermediate disc (locking ring) that projects into the radial seal gap between the sealing elements and a radial starting edge of the intermediate sleeve, the axial forces can be kept far from the radial seal and yet identify it with the axial movements.

By a radial superposed arrangement of bearing and axial gap sealing element, a short total length of the seal can be obtained and the radial forces can be effectively kept far from the sealing elements.

With adequate dimensioning, the bearing of the seal can also assume, as a double function, the task of an added bearing on the fluid side of the universal shaft.

Other details of the invention can be understood from the drawings:

FIG. 1 is a version of the anti-leak seal with radial support of the intermediate sleeve by means of a roller bearing against the corrugated machine part;

FIG. 2 is a version with the intermediate sleeve as sheet-metal molded part and simple sliding bearing, the rest is the same as version 1;

FIG. 2A is the front view on a torsional safety according to FIG. 2;

FIG. 3 is a version with radial support by means of a radial ball bearing that is also axially supported against the inner wall of the surrounding machine part and the intermediate sleeve;

Figure 4:
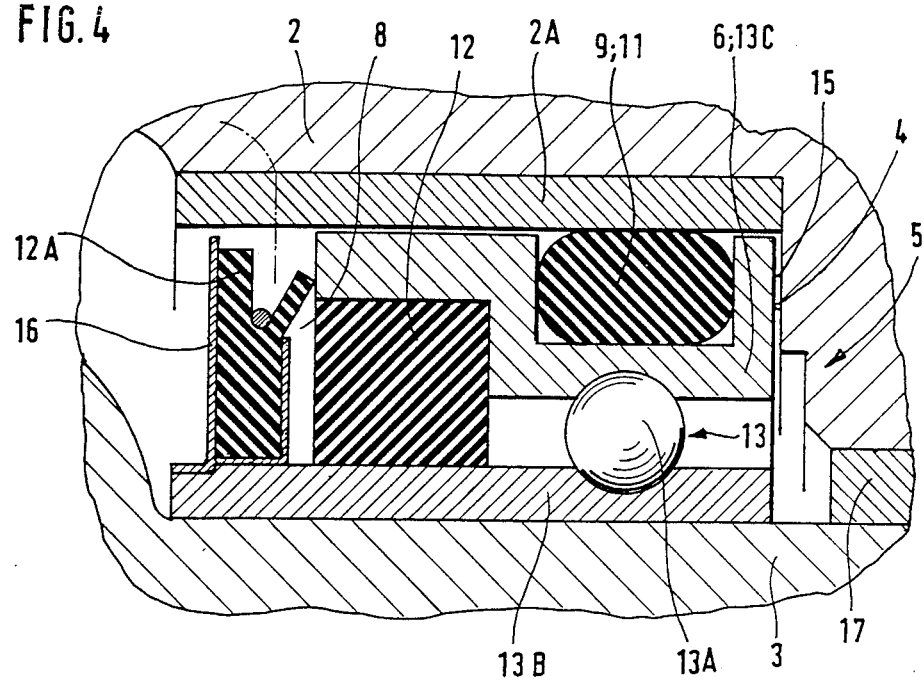
FIG. 4 is a version in which the torsional safety is obtained only by frictional forces from the axial seal gap and for the rest is arranged approximately like FIG. 1.

In FIG. 1 a corrugated machine part 1 is shown comprised of a housing-like machine part 2 in which fluid is contained (to the left in the drawing). A collar 3, non-rotatably connected with the corrugated machine part 1 via a spline 1A and axially held firm by means of a locking ring 1B, partly overlaps the corrugated machine part 1 and together with said corrugated machine part 1 not only rotates relative to the housing-like machine part 2 but also can travel axially until reaching a terminal position 4.

If the machine parts 1, 2 were, for instance, a shaft joint guide for driven steering axles, considerable radial forces can also appear during the axial thrust which can severely deform the sealing elements when the support is insufficient.

The anti-leak seal 5 radially situated between the machine parts 1 and 2 prevents fluid, such as oil, from flowing out of an immersion lubrication. According to the invention, the anti-leak seal is radially divided by an intermediate sleeve 6 of rigid material (such as sheet metal) that extends parallel with the corrugated machine part 1, thereby resulting in an axial seal gap 7 and a radial seal gap 8. The axial seal gap 7 is closed by at least one elastomeric sealing element which easily withstands the predominantly radial pre-load. Said sealing element is partially introduced in an annular groove on the outer periphery of the intermediate sleeve 6 and compressed from the outside against the finely polished bore surface of the housing-like machine part 2. A dirt stripper 9A, embedded in the housing-like machine part 2 and lying against a finely polished area of the intermediate sleeve 6, is situated outside the range of movement of the axial sealing element 9.

No rotation movement appears on these sealing elements 9, 9A, since the intermediate sleeve 6 is firmly retained in peripheral direction by a torsional safety 11 that overlaps the axial seal gap 7 and meshes with a recess 10 of the housing-like machine part 2, and thus can perform only limited axial movement.

In the example, the torsional safety 11 consists of a bolt that projects from the intermediate sleeve 6 into the interior of the housing-like machine part 2 and abuts in the direction of rotation on the walls of an inner recess 10 without impairing the axial mobility relative to the housing-like machine part 2 of the intermediate sleeve 6 carried by the corrugated machine part 1.

The radial seal gap 8 is closed by at least one elastomeric sealing element 12 with predominantly axial pre-load that allows relative rotation between the corrugated machine part 1, or the collar 3 that rotates therewith, and the intermediate sleeve 6 without being subjected to the axial movements thereof. For this purpose, the intermediate sleeve is axially retained by a rotatably movable axial fixation 13 opposite the collar 3 or the corrugated machine part 1. In this example a roller bearing 13A, retained by locking rings 14, 15 on the seal side of the intermediate sleeve, was selected for the axial fixation and by adequate supporting edges on the shaft side on the collar 3 and having its inner ring 13B supported on the seal side against a section 15A in the collar 3 and on the fluid side against a locking ring 15 in the collar 3. Its outer ring 13C is supported on the seal side against a locking ring 14 and, on the fluid side, against an inner wall 14A of the intermediate sleeve 6. The roller bearing 13A thereby does not allow axial displacement between the intermediate sleeve 6 and the collar 3 when pushed into or out of the housing-like machine part 2. At the same time, the roller bearing 13A rids the sealing element 12 that closes the axial seal 8 and a dirt stripper 12A of the axial gap, preferably situated before said sealing element, of inadmissible radial displacement as consequence of eventual lateral forces across the main axle. The penetration of dirt from the outside is made difficult by an axial dirt stripper 12A whose sealing lip is cushioned against a radial intermediate disc 16 on the fluid side.

In FIG. 2 the intermediate sleeve 6, as thin-walled metal-plate element, is provided with tongue-like projections as torsional safeties 11 inwardly meshing in the recesses 10 of the housing-like machine part 2. For the rest, the sealing elements 9, 9A and 12, 12A are here similarly placed, as already shown in FIG. 1. A radial flange edge of the intermediate sleeve 6 is used for axial fixation instead of a locking ring.

A carrier element (not designated in detail), for a shaft sealing ring, was welded in the area of the sealing elements 12, 12A on the inner side of the intermediate sleeve 6. A cassette-like configuration of the sealing element 12, 12A for the radial seal gap 8 was thus made possible. A ball bearing 13 is situated on the fluid side before an advance edge 15 of the housing-like machine part 2.

In FIG. 2A the torsional safety 11 is shown as tongue-like projection of the intermediate sleeve 6 meshing inwardly in the recess 10 of the housing-like machine part 2.

In FIG. 3 the position of the axial seal gap 7 was transposed in relation to the version according to FIG. 1 or 2. Here the seal gap 7 is on the inner side of the intermediate sleeve 6 opposite the corrugated machine part 1, or the collar 3 fastened thereon. The torsional safety 11 can consist of one bolt from the intermediate sleeve 6 that meshes radially in an axial recess of the collar 3. The bearing 13 is axially fixed between the outer side of the intermediate sleeve and the housing-like machine part. The sealing elements 12A or 12 that close the radial seal gap 8 abrade on the intermediate sleeve or the inner side of the radially standing intermediate disc 16 on the outer side end of the intermediate sleeve 6.

In FIG. 4 an arrangement following the principal of FIG. 1 has again been selected but the torsional safety 11 has been left only to the clamping action of the sealing elements 9 that close the axial seal gap 7. The intermediate sleeve 6 is provided on the inner side with a large recess for accommodating the sealing elements 12 that close the radial seal gap 8 and on the outer side with a circular annular groove for receiving the sealing element 9 that closes the axial seal gap 7. Directly and radially below the sealing element 9 that closes the axial seal gap, the balls of the bearing 13 are on the inner side of the intermediate sleeve 6 so that the intermediate sleeve 6 also serves the double function as the inner ring 13B of the bearing 13. Its inner ring 13B is non-rotatably and non-slidingly connected with the collar 3, or with the corrugated machine part 1. The seal, seen as a whole, is shown in the terminal position 4.

Figure 5:
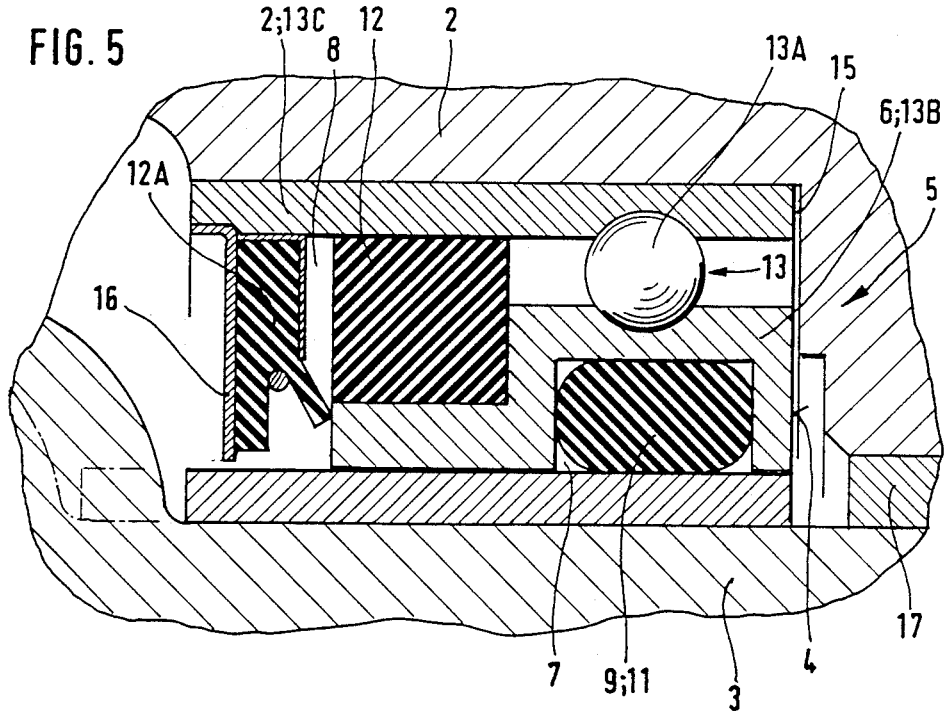
FIG. 5 is a version with the torsional safety likewise means of frictional forces but approximately corresponding to the principle of FIG. 3.

In FIG. 5 the arrangement of the sealing elements 9, which close the axial seal gap 7 and likewise act here as torsional safety 11 only through their clamping force, are shown precisely the opposite of FIG. 4. The intermediate sleeve 6 acts here as inner bearing race 13C of the ball bearing 13 and the sealing elements 12 or 12A which close the radial seal gap, rotate toward the inner side of the outer ring 13B or toward a sleeve in the housing-like machine part 2.

The types of construction of the anti-leak seal according to FIG. 4 and 5 stand out by their especially short total lengths and simple design, since the bearings and the sealing element 9 of the axial gap are directly and radially superimposed.

We claim:

1. An anti-leak seal for machine parts rotationally and axially movable relative to each other,
    especially for universal shafts connected by means of universal cross joints on steering axles of vehicles in housings full of a lubricant,
    and having an axial seal gap (7) separated from a radial seal gap (8) by means of a rigid intermediate sleeve (6) supported against the rotatably movable machine part via a bearing (13A),
    both seal gaps (7, 8) being closed by means of elastomeric sealing elements (9, 12) kept under pre-load relative to said intermediate sleeve (6),
    wherein said sealing element (9) situated in said axial gap (7) is axially fixed relative to said intermediate sleeve (6), characterized in that
    said bearing (13A) is situated in said radial seal gap (8) on the side of the lubricant and said intermediate sleeve (6) is fixed relative to said bearing (13A) by axial stops (14, 15),
    and in said axial seal gap (7) said intermediate sleeve (6) has a torsional safety (11) in relation to the non-rotating machine part (1 or 2),
    wherein recesses (10) are provided in said machine part (1 or 2) in which meshing elements (bolts, pawls) of said torsional safety (11) have a relative limited axial mobility.

2. A seal according to claim 1, characterized in that said axial fixation (13) comprises a bearing (13A) on both machine parts (1, 2) situated before said radial seal gap (8) on the fluid side, and having axial stops (14, 15) on said intermediate sleeve (6) and on said machine part (1, 2) relatively rotating opposite thereto.

3. A seal according to either claim 1, characterized in that said axial fixation (13) is a ball bearing.

4. A seal according to claim 1, characterized in that said torsional safety (11) comprises projections on said intermediate sleeve (6) that overlap said axial seal gap (7) and extend into recesses (10) in the axially movable machine part (1, 2) opposite thereto.

5. A seal according to claim 1, characterized in that said torsional safety (11) directly comprises said sealing element (9, 9A) that closes said axial seal gap (7), and is axially fastened to said intermediate sleeve (6) in an annular groove, and being retained in said axial seal gap (7) under radial pre-load.

6. A seal according to claim 1, characterized in that said axial fixation (13) comprises an radial intermediate disc (16A) projecting into said radial seal gap (8) and one radial advancing edge (15) of said intermediate sleeve (6).

7. A seal according to claim 1, characterized in that a ball bearing that assumes said axial fixation (13) has an axial position equal to that of said sealing element (9) that closes said axial seal gap (7).

8. A seal according to claim 1, characterized in that said anti-leak seal (5) is situated before a main bearing (17) immediately adjacent its fluid side.

* * * * *